(12) United States Patent
Bakke et al.

(10) Patent No.: US 10,174,573 B2
(45) Date of Patent: Jan. 8, 2019

(54) DOWNHOLE ACTUATOR DEVICE

(71) Applicant: TARGET Intervention AS, Algard (NO)

(72) Inventors: Stig Bakke, Algard (NO); Kenneth Bergland, Stavanger (NO); Thomas Berge, Hafrsfjord (NO)

(73) Assignee: TARGET Intervention AS, Algard (NO)

( * ) Notice: Subject to any disclaimer, the term of this patent is extended or adjusted under 35 U.S.C. 154(b) by 180 days.

(21) Appl. No.: 14/436,327

(22) PCT Filed: Oct. 17, 2013

(86) PCT No.: PCT/NO2013/050176
§ 371 (c)(1),
(2) Date: Apr. 16, 2015

(87) PCT Pub. No.: WO2014/070022
PCT Pub. Date: May 8, 2014

(65) Prior Publication Data
US 2015/0267491 A1 Sep. 24, 2015

(30) Foreign Application Priority Data
Nov. 2, 2012 (NO) .................................. 20121292

(51) Int. Cl.
E21B 23/06 (2006.01)
E21B 41/00 (2006.01)
E21B 33/128 (2006.01)

(52) U.S. Cl.
CPC ............ *E21B 23/06* (2013.01); *E21B 33/128* (2013.01); *E21B 41/00* (2013.01)

(58) Field of Classification Search
CPC .......... E21B 41/00; E21B 23/00; E21B 23/06; E21B 33/128
(Continued)

(56) References Cited

U.S. PATENT DOCUMENTS 3,062,292 A * 11/1962 Lowrey ................... E21B 23/06
166/120
5,303,776 A 4/1994 Ryan
(Continued)

FOREIGN PATENT DOCUMENTS

| EP | 1333207 A2 | 8/2003 |
|----|------------|--------|
| EP | 2175100 A1 | 4/2010 |
| GB | 2322885 A | 9/1998 |

OTHER PUBLICATIONS

International Preliminary Report on Patentability for PCT/NO2013/050176 dated May 11, 2014.
(Continued)

*Primary Examiner* — Taras P Bemko
*Assistant Examiner* — Jonathan Malikasim
(74) *Attorney, Agent, or Firm* — Andrus Intellectual Property Law, LLP

(57) ABSTRACT

A downhole actuator device comprises a central shaft formed with external threads; a sleeve formed with internal threads and placed substantially concentrically around the shaft; and an electromotor arranged to rotate at least a first one of said shaft and said sleeve so that a second one of said shaft and said sleeve may be moved linearly relative to the first one of said shaft and said sleeve. The actuator further comprises a plurality of roller screws that are rotatingly supported between the shall and sleeve in engagement with said external threads on the shaft and said internal threads on the sleeve.

7 Claims, 5 Drawing Sheets

(58) Field of Classification Search
USPC .......................................................... 166/381
See application file for complete search history.

(56) References Cited

U.S. PATENT DOCUMENTS

| | | | | |
|---|---|---|---|---|
| 5,492,173 A * | 2/1996 | Kilgore | ................... | E21B 23/06 |
| | | | | 166/66.4 |
| 6,722,441 B2 * | 4/2004 | Lauritzen | ................... | E21B 4/18 |
| | | | | 166/207 |
| 7,287,591 B2 * | 10/2007 | Campbell | ............... | E21B 27/02 |
| | | | | 166/162 |
| 7,559,361 B2 * | 7/2009 | Obrejanu | ................ | E21B 23/00 |
| | | | | 166/301 |
| 8,424,596 B2 * | 4/2013 | Bebb | ....................... | E21B 41/00 |
| | | | | 166/104 |
| 2006/0102336 A1 | 5/2006 | Campbell | | |
| 2010/0025608 A1 | 2/2010 | Esveldt | | |
| 2011/0073329 A1 | 3/2011 | Clemens et al. | | |
| 2012/0042741 A1 | 2/2012 | Jacob et al. | | |
| 2012/0168176 A1 * | 7/2012 | Aguirre | .................... | E21B 4/18 |
| | | | | 166/378 |

OTHER PUBLICATIONS

International Search Report and Written Opinion for PCT/NO2013/050176 dated Jan. 13, 2014.
Written Opinion of the International Preliminary Examining Authority for PCT/NO2013/050176 dated Jul. 10, 2014.

* cited by examiner

US 10,174,573 B2

DOWNHOLE ACTUATOR DEVICE

CROSS-REFERENCE TO RELATED APPLICATIONS

This application is the U.S. national stage application of International Application PCT/NO2013/050176, filed Oct. 17, 2013, which international application was published on May 8, 2014, as International Publication WO 2014/070022 in the English language. The international application is incorporated herein by reference, in entirety. The international application claims priority to Norwegian Patent Application No. 20121292, filed Nov. 2, 2012, which is incorporated herein by reference, in entirety.

FIELD

The invention relates to a downhole actuator device. More specifically, the invention relates to a downhole actuator device including a roller screw. The invention also relates to a method of using the actuator, and a use of an actuator in accordance with the invention in a downhole environment.

BACKGROUND

The power loss in long downhole electrical transfer cables in connection with the recovery of petroleum may be considerable, and the maximum allowed transfer voltage is set by official regulations. Further, both downhole generators and electromotors must be limited in size because of the limited diameter of the wellbore. Downhole electromotors therefore have limited power. Because of that, it may be a challenge to provide sufficient forces for carrying out various operations downhole. Downhole actuators may use ball screws or the like to convert rotation into linear motion, wherein a shaft rotates inside a sleeve. The shaft and the sleeve are formed with complementary threads, and thus, when the shaft is rotated, the sleeve is moved along the shaft. The friction loss in such a ball screw can be considerable, and the ball screw may be subjected to great concentrated loads by great axial loads on the actuator.

The patent document EP 2175100 A1 discloses an apparatus for downhole directional drilling. The apparatus uses a linear, electrically operated actuator.

The patent document US 2012004271 A1 discloses a mechanical actuator for use in wind mills, among other things. The actuator uses roller screws to convert rotation into linear movements.

SUMMARY

The invention has for its object to remedy or reduce at least one of the drawbacks of the prior art or at least provide a useful alternative to the prior art.

The object is achieved through features which are specified in the description below and in the claims that follow.

In a first aspect, the invention relates to a downhole actuator device, the actuator including:
  a central shaft formed with external threads;
  a sleeve formed with internal threads and placed substantially concentrically around the shaft; and
  an electromotor arranged to rotate at least a first one of said shaft and said sleeve so that a second one of said shaft and said sleeve may be moved linearly relative to the first one of said shaft and said sleeve, characterized by the actuator further including a plurality of roller screws rotatingly supported between the shaft and the sleeve in engagement with said external threads on the shaft and said internal threads on the sleeve.

By using roller screws, an actuator in accordance with the invention may reduce the friction loss compared with a corresponding actuator using a ball screw, in which the power is transferred by rotation flank to flank. Ball screws may also be subjected to great concentrated loads by great axial loads on the actuator. The advantage of reduced friction and concentrated load may be an improvement of the efficiency and an ability to withstand greater axial loads. The roller screw could be particularly well suited in cases in which a great starting torque is required for the actuator.

In one embodiment, the shaft may be hollow. This will be an advantage as various fluids can be circulated through the shaft, and it could also facilitate the attachment of the shaft to other downhole components.

In a second aspect, the invention relates to a method of using a downhole actuator, the actuator including:
  a central shaft formed with external threads;
  a sleeve formed with internal threads and placed substantially concentrically around the shaft; and
  an electromotor arranged to rotate at least a first one of said shaft and said sleeve so that a second one of said shaft and said sleeve may be moved linearly relative to the first one of said shaft and said sleeve, characterized by the method including the following steps:
  placing a plurality of roller screws between said shaft and said sleeve; and
  rotating the first one of said shaft and said sleeve by means of the electromotor, so that the rotation is converted into a linear movement of the second one of said shaft and said sleeve via the roller screws.

In one embodiment, the method may further include activating a packer element on a downhole tool by means of said linear movement of the second one of said shaft and said sleeve.

In another embodiment, the method may additionally or alternatively include activating a wedge device on a downhole tool by means of said linear motion of the second one of said shaft and said sleeve.

In a third aspect, the invention relates to the use of an actuator in accordance with the above description on a downhole tool.

In one embodiment, the above-mentioned actuator may be used to activate a packer element on the downhole tool.

In another embodiment, the above-mentioned actuator may additionally or alternatively be used to activate a wedge device on the downhole tool.

A downhole tool including an actuator in accordance with the above description is described as well.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
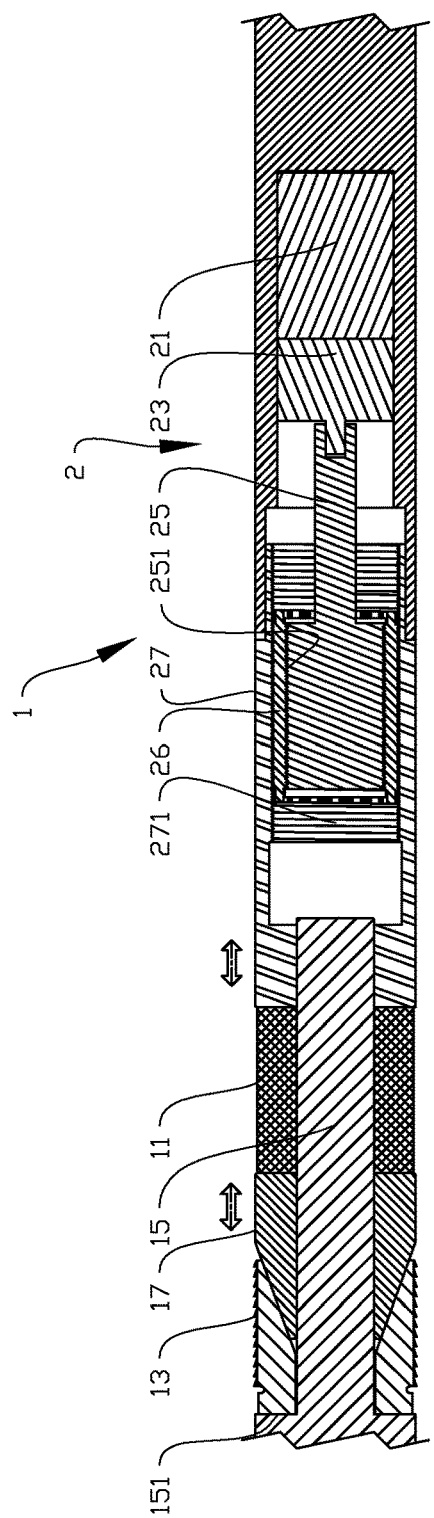
FIG. 1 shows, in a side view, an actuator in accordance with the invention placed on a downhole tool in a passive position.

In what follows, the reference numeral 2 indicates an actuator in accordance with the present invention. The actuator 2 is shown in a simplified and schematic manner. The actuator 2 is shown placed on a downhole tool 1 including a packer element 11 and a wedge device 13, only a portion of the downhole tool 1 being shown in the figures. An electromotor 21 is connected to a shaft 25 via a gearing device 23. A portion of the shaft 25 is formed with external threads 251. The threaded portion of the shaft 25 is enclosed by a sleeve 27 which, in a portion, is formed with internal threads 271. Between the threaded portions 251, 271 of the shaft 25 and the sleeve 27, a plurality of roller screws 26 are placed, arranged to rotate in engagement with both the external threads 251 of the shaft 25 and the internal threads 271 of the sleeve 27 and thus to convert the rotation of the shaft 25 into a linear movement of the sleeve 27 relative to the shaft 25. In an alternative embodiment, the sleeve 27 could be rotated to move the shaft 25 linearly.

In FIG. 1, the downhole tool 1 is shown in a non-activated, passive position. The actuator 2 includes an electromotor 21 and a gearing device 23 connected to the shaft 25. The packer 11 lies between the sleeve 27 and a tapered sleeve 17 around a guide mandrel 15. The front portion of the tapered sleeve 17 is formed with an inclined gliding surface complementarily fitting a rear, inclined gliding surface of the wedge device 13. A front portion of the wedge device 13 abuts against a shoulder 151 on the guide mandrel 15.

Figure 2:
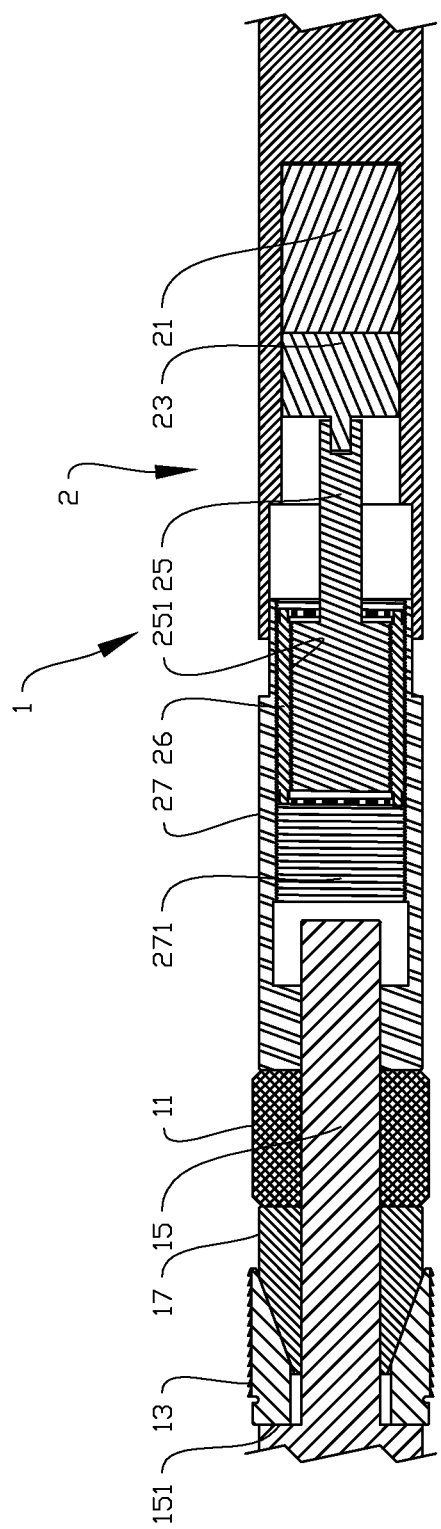
FIG. 2 shows, in a side view, the same downhole tool as FIG. 1 in an intermediate position.

As the electromotor 21 starts, the shaft 25 is rotated via the gearing device 23. The rotation of the shaft 25 rotates the roller screws 26 which in turn rotate in engagement with the internal threads 271 of the sleeve 27 so that the sleeve 27 is moved linearly relative to the shaft 25 and the rest of the downhole tool 1. The sleeve 27 pushes the packer 11 and the tapered sleeve 17, which surrounds the guide mandrel 15, in towards the wedge device 13. The tapered sleeve 17 is moved in towards the wedge device 13, whereas the wedge device 13 hits the shoulder 151. The wedge device 13 is thus forced out from the downhole tool 1, as shown in FIG. 2. At the same time, the packer element 11 is compressed between the sleeve 27 and the tapered sleeve 17 so that the packer element 1 expands radially.

Figure 3:
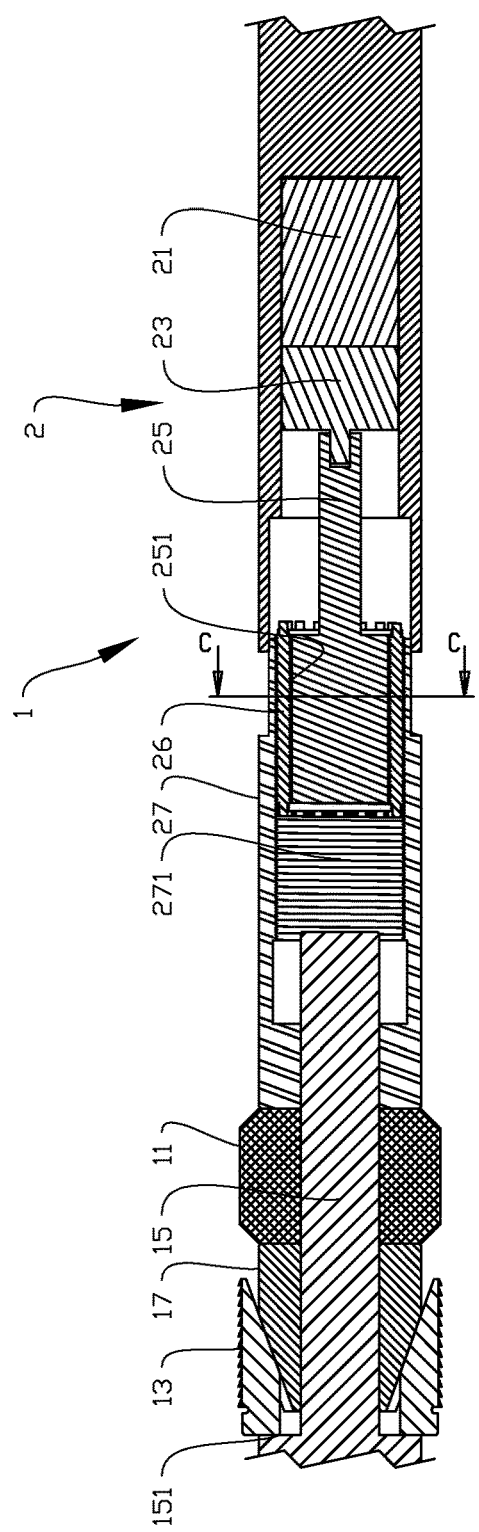
FIG. 3 shows, in a side view, the same downhole tool as FIG. 1 in an active position.

In FIG. 3, the downhole tool is shown after the wedge device 13 has been moved out into engagement with the inside of a tubular body not shown, whereas the packer element 11 is set in a sealing engagement with the same tubular body not shown.

Figure 4:
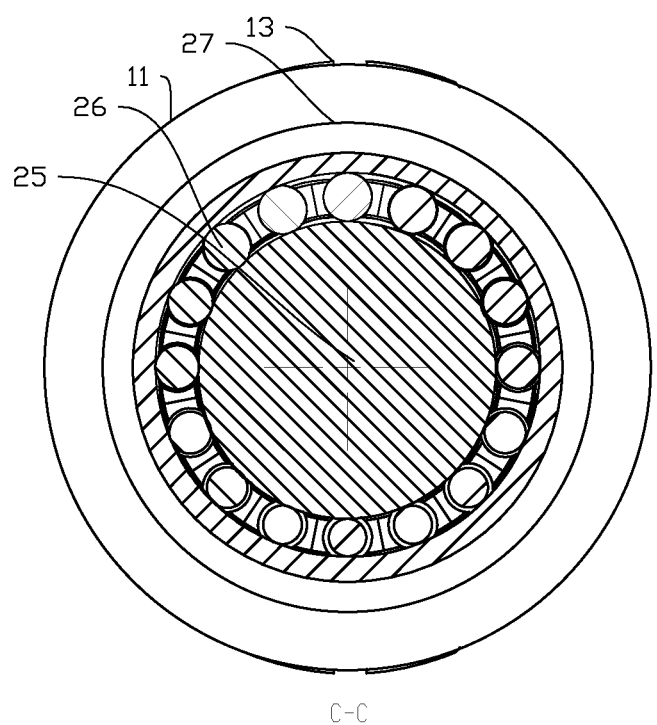
FIG. 4 shows a section of the downhole tool, seen through the line C-C of FIG. 3.
Figure 5:
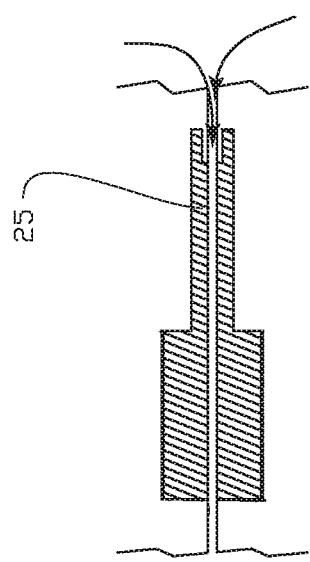
FIG. 5 shows a hollow shaft of the actuator in which fluids are circulated therethrough.

FIG. 4 shows a section through the downhole tool 1 seen through the line C-C of FIG. 3. The figure shows the plurality of roller screws 26 between the shaft 25 and the sleeve 27.

The invention claimed is:

1. A downhole actuator device comprising:
a central shaft formed with external threads;
a sleeve formed with internal threads and placed substantially concentrically around the shaft;
an electromotor arranged to provide relative rotational movement between the shaft and the sleeve so as to provide relative linear movement therebetween, the relative linear movement, in turn, causing axial compression of an element which is radially expandable relative to a guide mandrel that is rotationally and linearly fixed in relation to the electromotor wherein the rotation of the shaft creates linear movement of the sleeve which is slidable longitudinally along the guide mandrel; and
a plurality of roller screws rotatingly supported between the shaft and sleeve in engagement with the external threads on the shaft and the internal threads on the sleeve;
wherein the shaft is hollow.

2. A method of using a downhole actuator device, the method comprising:
forming a central, hollow shaft with external threads;
forming a sleeve with internal threads and placing the sleeve substantially concentrically around the shaft;
arranging an electromotor to provide relative rotational movement between the shaft and the sleeve so as to produce relative linear movement therebetween;
placing a plurality of roller screws between the shaft and the sleeve;
providing the relative rotational movement between the shaft and the sleeve with the electromotor, so that the relative rotational movement is converted into the relative linear movement between the shaft and the sleeve via the roller screws, the relative linear movement, in turn, causing axial compression of an element which is radially expandable relative to a guide mandrel that is rotationally and linearly fixed in relation to the electromotor wherein the rotation of the shaft creates linear movement of the sleeve which is slidable longitudinally along the guide mandrel; and
circulating fluids through the shaft.

3. The method in accordance with claim 2, further comprising activating a packer element on a downhole tool with the relative linear movement between the shaft and the sleeve.

4. The method in accordance with claim 2, further comprising activating a wedge device on a downhole tool with the relative linear movement between the shaft and the sleeve.

5. The method in accordance with claim 2, further comprising using the downhole actuator device to activate a packer element on a downhole tool.

6. The method in accordance with claim 2, further comprising using the downhole actuator device to activate a wedge device on a downhole tool.

7. A downhole tool comprising:
a downhole actuator device comprising:
a central hollow shaft formed with external threads;
a sleeve formed with internal threads and placed substantially concentrically around the shaft, the sleeve having a front end and a rear end;
an electromotor mounted in a portion of the downhole tool and arranged to provide relative rotational movement between the shaft and the sleeve so as to produce relative linear movement therebetween;
a plurality of roller screws rotatingly supported between the shaft and sleeve in engagement with the external threads on the shaft and the internal threads on the sleeve;
a guide mandrel formed by an elongated member having one end formed with a smooth outer surface of constant diameter slidably received in the front end of the sleeve, and an opposite end extending radially from the elongated member and defining a shoulder thereon, the guide mandrel being rotationally and linearly fixed in relation to the electromotor wherein the rotation of the shaft creates linear movement of the sleeve which is slidable longitudinally along the guide mandrel;

a tapered sleeve surrounding the elongated member of the guide mandrel and having a rear portion and a front portion formed with a front inclined gliding surface;

a compressible packer element mounted around the elongated member of the guide mandrel and positioned between the front end of the sleeve and the rear portion of the tapered sleeve; and a wedge device mounted around the elongated member of the guide mandrel and positioned between the shoulder of the guide mandrel and the tapered sleeve, the wedge device having a rear portion formed with a rear inclined guiding surface complementarily fitting against the front inclined guiding surface of the tapered sleeve, and a front portion abutting against the shoulder of the guide mandrel;

wherein the relative linear movement between the shaft and the sleeve causes the sleeve to push against and axially compress the packer element as the sleeve slides linearly along the smooth outer surface of the guide mandrel so that the packer element expands radially, and also causes movement of the tapered sleeve against the wedge device such that the front portion of the wedge device is moved radially along the shoulder of the guide mandrel as the rear inclined guiding surface of the wedge device rides along the front inclined guiding surface of the tapered sleeve thereby forcing the wedge device radially outwardly, the packer element and the wedge device being adapted to engage a tubular body.

* * * * *